United States Patent [19]

McCarthy

[11] 3,775,645

[45] Nov. 27, 1973

[54] HEADER ASSEMBLY

[76] Inventor: Thomas F. McCarthy, 23 Centre St., Waltham, Mass. 02154

[22] Filed: Aug. 8, 1972

[21] Appl. No.: 278,809

[52] U.S. Cl. ...... 317/234 A, 317/234 G, 317/234 H, 174/52 S

[51] Int. Cl. ............................ H01l 3/00, H01l 5/00

[58] Field of Search ........................ 317/234, 1, 3.1, 317/4, 4.1; 29/588; 174/52 S

[56] References Cited

UNITED STATES PATENTS

| | | | |
|---|---|---|---|
| 2,825,014 | 2/1958 | Willemse | 317/234 A |
| 3,188,251 | 6/1965 | Straight et al. | 317/234 A |
| 3,258,662 | 6/1966 | Fleming | 317/234 A |
| 3,265,942 | 8/1966 | Osborne | 317/234 A |
| 3,419,763 | 12/1968 | Beaudouin | 317/234 G |
| 3,528,102 | 9/1970 | Rodet et al. | 317/234 G |
| 3,618,203 | 11/1971 | Pryor | 317/234 G |

*Primary Examiner*—John W. Huckert
*Assistant Examiner*—Andrew J. James
*Attorney*—Norman S. Blodgett

[57] ABSTRACT

A semiconductor header assembly is provided which can be hermetically sealed and which will be impermeable to gas leakage. The assembly includes a shell formed by stamping from a metallic sheet having its grain boundaries lying in a plane parallel to the surface of the sheet thereby forming a barrier to the passage of gas therethrough.

4 Claims, 2 Drawing Figures

HEADER ASSEMBLY

BACKGROUND OF THE INVENTION

This invention relates to hermetically sealed devices and, more particularly, to a metal shell for use in a hermetically sealed semiconductor device such as a power transistor or the like.

When a semiconductor device such as a power transistor or the like is employed at a relatively high power rating, a large amount of heat is generated thereby. In order to remove this heat, a metal header can be employed to function as a heat sink. In such cases, the header is formed with an appropriate threaded stud for fastening to an additional heat sink fabrication. The terminals of the device extend through the shell and are held rigid within the holes of the shell by a glass seal.

In the manufacture of a semiconductor device, it is often necessary to hermetically seal such a device so that gas will not pass therethrough. One problem arising in the manufacture of such devices, especially high power devices, when the shell of the header assembly is machined from rod stock, is the tendency of gas to leak in the direction of the axis of the rod through grain boundaries or interstices. This results in an unsuitably high reject rate.

It is a further requirement of a shell in such applications that it be of sufficient thickness to adequately support the wires in a rigid and stable position and to adequately form the requisite metal-to-glass-to-metal seal. If sufficient thickness is not obtained, the seal will be easily broken and/or the wires will not be rigidly held in position, resulting in an unsuitable device.

It is, therefore, an object of the present invention to provide an inexpensive hermetically sealed device.

It is a further object of the present invention to provide a header assembly including a shell in which the grain boundaries or pores lie in a direction approximately parallel to the surface thereof and thereby form a barrier to the passage or leakage of gas therethrough.

It is a still further object to provide a shell for a semiconductive device which will be of sufficient thickness to rigidly support terminals which pass therethrough and to maintain the requisite metal-to-glass-to-metal seal to insure a hermetically sealed device.

With these and other objects in view, as will be apparent to those skilled in the art, the invention resides in the combination of parts set forth in the specification and covered by the claims appended hereto.

SUMMARY OF THE INVENTION

The header of the semiconductor device of the present invention is an assembly that includes a shell formed by stamping from sheet metal. Since the pores or grain boundaries in sheet metal lie parallel to the surface of the sheet, they will form a barrier to the passage or leakage of gas through such a stamping. To provide the necessary thickness for the shell assembly to maintain a suitable metal-to-glass-to-metal seal to hold the terminals in a fixed position, the shell is provided with a metal insert which is positioned in the top portion thereof by any suitable means, such as a press fit, welding, soldering, staking, riveting, indenting, clinching, or the like. This metal insert can be formed by stamping or machining. The requisite holes through which the terminals are to pass can be formed in the stamped shell and the insert by stamping or drilling either before or after assembly thereof.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 2:
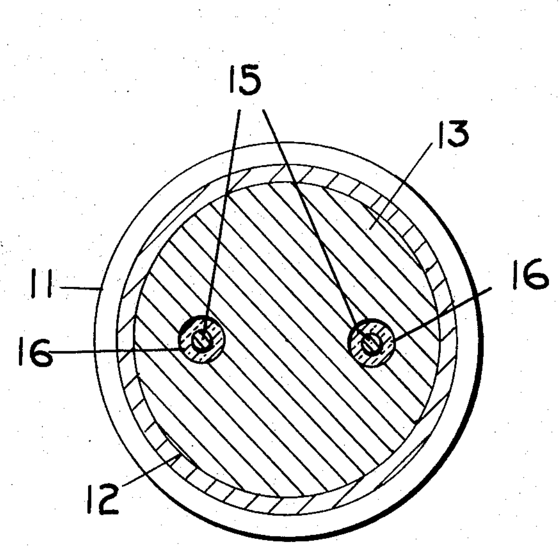
FIG. 2 is a sectional view taken along the line II—II of FIG. 1.
Figure 1:
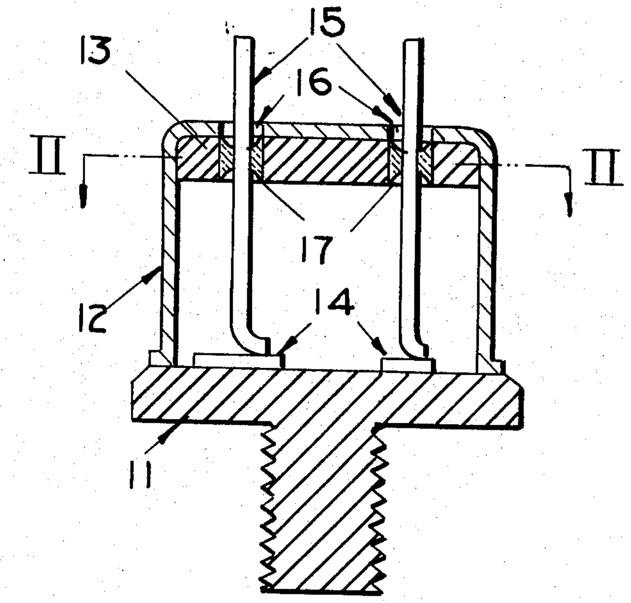
FIG. 1 is an elevational view in section of a hermetically sealed semiconductor device in accordance with the present invention.

Referring to the figures, the semiconductor device includes a header assembly designated generally by reference numeral 11 and a cover assembly includes a stamped metal body 12, commonly referred to as a shell having a metal insert 13 fixedly secured therein. A semiconductor device 14 may be mounted on the surface of the header assembly 11 and one or more lead-in terminals 15 connected thereto. The shell assembly has one or more holes 16 therethrough to receive the lead-in terminals 15. These terminals 15 are rigidly sealed in position by an insulating material 17, such as glass, which forms a metal-to-glass-to-metal vacuum seal.

The stamped metal shell 12 of the cover assembly is preferably formed from a sheet of cold rolled steel so that the pores or grain boundaries lie in a plane parallel to the surface of the sheet and thus form a barrier to the passage of gas therethrough. Number 1018 cold rolled special kilned steel sheet, Kovar, or the like has been found suitable for this application The metal insert 13 is preferably made of steel having similar thermal expansion properties as those of the shell 12. Due to the impermeability of the shell 12 to gas, it is possible to produce a semiconductor device which is capable of being hermetically sealed and which will be capable of maintaining the necessary terminals or leads rigidly in position.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A header assembly for a semiconductor device including a base, a shell in the form of a dome with a roof mounted on the base, the shell being formed from a stamped metal sheet having the grain boundaries lying in a plane substantially parallel to the surface of the sheet, a semiconductor device mounted on the base within the shell, a metal insert fixedly attached to the roof of said shell, passages extending through the said roof of the shell and through said insert, terminals positioned within said passages, and insulating material within said passages forming a hermetic seal between the metal insert and the terminals.

2. The header assembly of claim 1, wherein the metal insert has thermal expansion properties approximately the same as those of said shell.

3. The header assembly of claim 1, wherein the shell is stamped from a cold rolled sheet of 1018 special killed steel.

4. The header assembly as recited in claim 2, wherein the shell is formed of Kovar.

* * * * *